United States Patent [19]

Suzuki et al.

[11] Patent Number: 4,975,722
[45] Date of Patent: Dec. 4, 1990

[54] FOCAL PLANE SHUTTER

[75] Inventors: Akira Suzuki; Kenichi Watabe, both of Tokyo, Japan

[73] Assignee: Copal Company Limited, Tokyo, Japan

[21] Appl. No.: 476,523

[22] Filed: Feb. 7, 1990

[30] Foreign Application Priority Data

Feb. 10, 1989 [JP] Japan .................................... 1-31715
Feb. 10, 1989 [JP] Japan .................................... 1-31716

[51] Int. Cl.⁵ ............................................... G03B 9/40
[52] U.S. Cl. ..................................... 354/246; 354/252
[58] Field of Search ................ 354/246, 248, 249, 252

[56] References Cited

U.S. PATENT DOCUMENTS

| | | | |
|---|---|---|---|
| 4,302,091 | 11/1981 | Harase et al. | 354/246 |
| 4,692,009 | 9/1987 | Toyoda et al. | 354/246 |
| 4,739,355 | 4/1988 | Saito | 354/252 |
| 4,829,329 | 5/1989 | Toyoda et al. | 354/246 |
| 4,847,649 | 7/1989 | Toyoda et al. | 354/246 |

*Primary Examiner*—A. A. Mathews
*Attorney, Agent, or Firm*—Wenderoth, Lind & Ponack

[57] ABSTRACT

A focal plane shutter includes a first blade group which is moved forward from an unfolding state to an overlapping state to start an exposure in response to the release of a first blade driving spring and a second blade group which is moved forward from an overlapping state to an unfolding state to terminate the exposure in response to the release of a second blade driving spring. The force of the driving springs for applying the impellent force to the blade groups is removed from the corresponding blade groups before each of the blade groups reaches an end of forward movement so that the blade groups are moved by the force of inertia. The driving spring for applying the impellent force to the blade groups is engaged with a first arm formed on one end of a swingably supported brake lever before the blade group reaches the end of forward movement so that a second arm formed on the other endd of the brake lever is rotated to prevent the movement of the blade group. Since the blade groups are moved to the end of forward movement while receiving the braking force by engagement with the second arms of the corresponding brake levers, shock or oscillation at the termination of forward movement is reduced.

12 Claims, 7 Drawing Sheets

FOCAL PLANE SHUTTER

BACKGROUND OF THE INVENTION

The present invention relates to a focal plane shutter for a still camera, and more particularly to a focal plane shutter including a novel shock absorption mechanism which effectively absorbs shock or oscillation upon the termination of the shutter operation and suitable for a high-speed shutter having a high blade speed.

A focal plane shutter for a recent camera, particularly a single lens reflex camera, attains the high-speed operation of shutter blades in order to maintain the exposure accuracy in a short exposure time and increase the strobo synchronization speed. A shutter of a vertical movement type, for example, was generally moved across a vertical distance of an aperture of 24 mm in about 7 ms several years ago, whereas it is adapted to be moved in about 3 ms recently.

As well known, in the focal plane shutter, shock or oscillation upon the termination of movement of the shutter blades is increased as the blade speed is increased. Further, it is also well known that the shock or oscillation causes large operation sound of the shutter and deterioration of the durability of the shutter. Accordingly, in order to reduce the operation sound of the shutter and improve the durability of the shutter, the focal plane shutter having a high blade speed is generally provided with a shock absorption mechanism for absorbing shock and oscillation upon the termination of movement of the shutter blades.

A conventional shock absorption mechanism which includes a rotatable brake lever held to be pressed between a friction plate and a leaf spring and disposed in a path through which a shutter blade driving member passes is generally known.

With such a shock absorption mechanism, when the blade driving member strikes against the brake lever, the brake lever is rotated while receiving friction between the friction plate and the leaf spring so that the kinetic energy of the blade driving member and the shutter blades is converted into the thermal energy generated by friction of the friction plate and the brake lever and accordingly shock upon the termination of movement of the shutter blades is absorbed.

However, the above-mentioned friction type shock absorption mechanism has many problems described below.

The coefficient of friction between the friction plate and the brake lever is affected by variation in temperature and accordingly the shock absorption performance is also affected by variation in temperature.

In addition, it is necessary to secure the space for disposing the shock absorbing brake lever and the friction mechanism near the space for disposing the driving mechanism for the shutter. Consequently, the space efficiency is reduced.

Further, since it is required to charge the shock absorption mechanism against the friction force at the same time when the shutter driving mechanism is charged, the charging force is increased.

SUMMARY OF THE INVENTION

It is an object of the present invention to provide a focal plane shutter including a shock absorption mechanism in which the abovementioned many problems are solved.

The shock absorption mechanism included in the focal plane shutter according to the present invention is difficult to be affected by variation in temperature.

In addition, the shock absorption mechanism of the focal plane shutter according to the present invention does not require space for disposing the mechanism itself and improves the space efficiency as the whole shutter mechanism.

Further, the shock absorption mechanism does not require increased charging force when a shutter driving mechanism is charged.

The focal plane shutter according to the present invention comprises a shutter base plate in which an aperture for the exposure is formed; a first blade group including a plurality of divided blade elements which close the aperture by unfolding the blade elements over the aperture for the exposure and open the aperture by overlapping the blade elements at a position evacuated from the aperture; a second blade group including a plurality of divided blade elements which open the aperture by overlapping the blade elements at the position evacuated from the aperture and close the aperture by unfolding the blade elements over the aperture; a first blade driving spring which is kept in a charged state and moves forward the first blade group from the unfolding state to the overlapping state by releasing the first blade driving spring from the charged state; a first blade driving force transmission mechanism which is engaged with the first blade driving spring to transmit the force of the first blade driving spring to the first blade group as a propelling force; a second blade driving spring which is kept in the charged state and moves forward the second blade group from the overlapping state to the unfolding state by releasing the second blade driving spring from the charged stage when a predetermined time has lapsed after the first blade driving spring has been released; and a second blade driving force transmission mechanism which is engaged with the second blade driving spring to transmit the force of the second blade driving spring to the second blade group as a propelling force.

Further, in the focal plane shutter according to the present invention, the first blade driving spring and the first blade driving force transmission mechanism engaged with each other can be separated from each other, and the second blade driving spring and the second blade driving force transmission mechanism engaged with each other can be separated from each other. The focal plane shutter further comprises a first blade brake lever which is swingably supported to an axis mounted at a position fixed to a camera body and includes a first arm formed in one end of the lever to engage with the first blade driving spring so that the forward movement of the first blade driving spring is prevented and a second arm formed in the other end of the lever to engage with the first blade driving force transmission mechanism so that the forward movement of the first blade driving force transmission mechanism is prevented, the first arm being engaged with the first blade driving spring before the first blade driving force transmission mechanism moves forward to the end of the forward movement to separate the first blade driving spring and the first blade driving force transmission mechanism engaged with each other and rotate the second arm so that the forward movement of the first blade driving force transmission mechanism is prevented; and a second blade brake lever which is swingably supported to an axis mounted at a position fixed to the camera body and includes a first arm formed in one end of the second blade brake lever to engage with the second blade driving spring so that the forward movement of the second blade driving spring is prevented and a second arm formed in the other end to engage with the second blade driving force transmission mechanism so that the forward movement of the second blade driving force transmission mechanism is prevented, the first arm being engaged with the second blade driving spring before the second blade driving force transmission mechanism moves forward to the end of the forward movement to separate the second blade driving spring and the second blade driving force transmission mechanism engaged with each other and rotate the second arm so that the forward movement of the second blade driving force transmission mechanism is prevented.

Alternatively, in the focal plane shutter structured above, the first blade driving force transmission mechanism comprises a first blade operation lever which is swingably supported to an axis mounted at a position fixed to the camera body to be coupled with the first blade group so that the first blade group is operated in the forward direction or the backward direction in accordance with the swinging direction of the first blade operation lever, a first blade driving lever which is swingably supported to an axis mounted at a position fixed to the camera body and includes an engagement portion engaged with the first blade operation lever so that the first blade operation lever is moved forward, and a first blade brake lever which is swingably supported to an axis mounted on the first blade driving lever and includes a first arm formed in one end of the first blade brake lever to be engaged with the first blade driving spring and a second arm formed in the other end of the first blade brake lever to be engaged with the first blade driving lever so that the first blade driving lever is moved backward. The end of the forward movement of the first blade driving lever is formed nearer to the initial position rather than the end of the forward movement of the first blade operation lever. The second blade driving force transmission mechanism comprises a second blade operation lever which is swingably supported to an axis mounted at a position fixed to the camera body and coupled with the second blade group so that the second blade group is operated in the forward direction or the backward direction in accordance with the swinging direction of the second blade operation lever, a second blade driving lever which is swingably supported to an axis mounted at a position fixed to the camera body and includes an engagement portion engaged with the second blade operation lever so that the second blade operation lever is moved forward, and a second blade brake lever which is swingably supported to an axis mounted on the second blade driving lever and includes a first arm formed in one end of the second blade brake lever to be engaged with the second blade driving spring and a second arm formed in the other end of the second blade brake lever to be engaged with the second blade driving lever so that the second blade driving lever is moved backward. The end of the forward movement of the second blade driving lever is formed nearer to the initial position rather than the end of the forward movement of the second blade operation lever.

More preferably, according to the present invention, the first blade driving force transmission mechanism and the first blade group keep the force of inertia capable of moving forward to the end of the forward movement thereof against the force applied through the first blade brake lever in the direction of preventing the forward movement even after the force in the forward direction applied from the first blade driving spring is cut off. Further, the second blade driving force transmission mechanism and the second blade group keep the force of inertia capable of moving forward to the end of the forward movement thereof against the force applied through the second blade brake lever in the direction of preventing the forward movement even after the force in the forward direction applied from the second blade driving spring is cut off.

More preferably, the focal plane shutter according to the present invention further comprises a first blade rebound stopper which is swingably supported to an axis mounted at a position fixed to the camera body to be engaged with the first blade driving force transmission mechanism at the end of the forward movement and which removes the engagement with the first blade driving force transmission mechanism when the second blade driving force transmission mechanism is moved forward to the end of the forward movement.

Further, in the case where the first blade driving force transmission mechanism includes the first blade operation lever and the first blade driving lever while the second blade driving force transmission mechanism includes the second blade operation lever and the second blade driving lever, the end of the backward movement of the first blade driving lever is formed at a position retreated as compared with the end of the backward movement of the first blade operation lever.

Basically, the focal plane shutter according to the present invention moves forward the first blade group in a state in which the aperture for the exposure is closed to start the exposure by releasing the charged first blade driving spring and moves forward the second blade group in a state in which the aperture is opened to terminate the exposure by releasing the charged second blade driving spring after a desired time from the release of the first blade driving spring.

In the present invention, the first and second blade groups are moved forward by the propelling force which is the force of the corresponding driving springs.

However, in the focal plane shutter according to the present invention, the propelling force from the driving spring is cut off before the corresponding blade group reaches the end of the forward movement.

For example, in the case where the brake lever is swingably supported to an axis mounted at a position fixed to the camera body, the propelling force from the driving spring is not transmitted to the blade group after the driving spring has been engaged with the first arm of the brake lever and the driving force transmission mechanism has been engaged with the second arm of the brake lever.

Further, for example, in the case where the driving force transmission mechanism includes the blade operation lever and the blade driving lever and the end of the forward movement of the blade driving lever is formed nearer to the initial position rather than the end of the forward movement of the blade operation lever, the propelling force from the driving spring is not transmitted to the blade group after the blade driving lever has reached the end of the forward movement.

The propelling force from the driving spring is cut off and at the same time the force of the driving spring is reversed by the brake lever to be transmitted to the blade group as a brake force.

Since the blade group and the mechanism members coupled thereto move forward by the force of inertia thereof against the brake force, shock and oscillation upon the termination of the movement are absorbed by the brake force and accordingly any friction member for absorbing shock and oscillation is not required. Accordingly, the shock absorption mechanism of the focal plane shutter according to the present invention is not affected by variation of the coefficient of friction due to variation in temperature and does not require increased force for charging the friction member.

DETAILED DESCRIPTION OF THE PREFERRED EMBODIMENTS

An embodiment of the present invention will be now described with reference to drawings.

Figure 1:
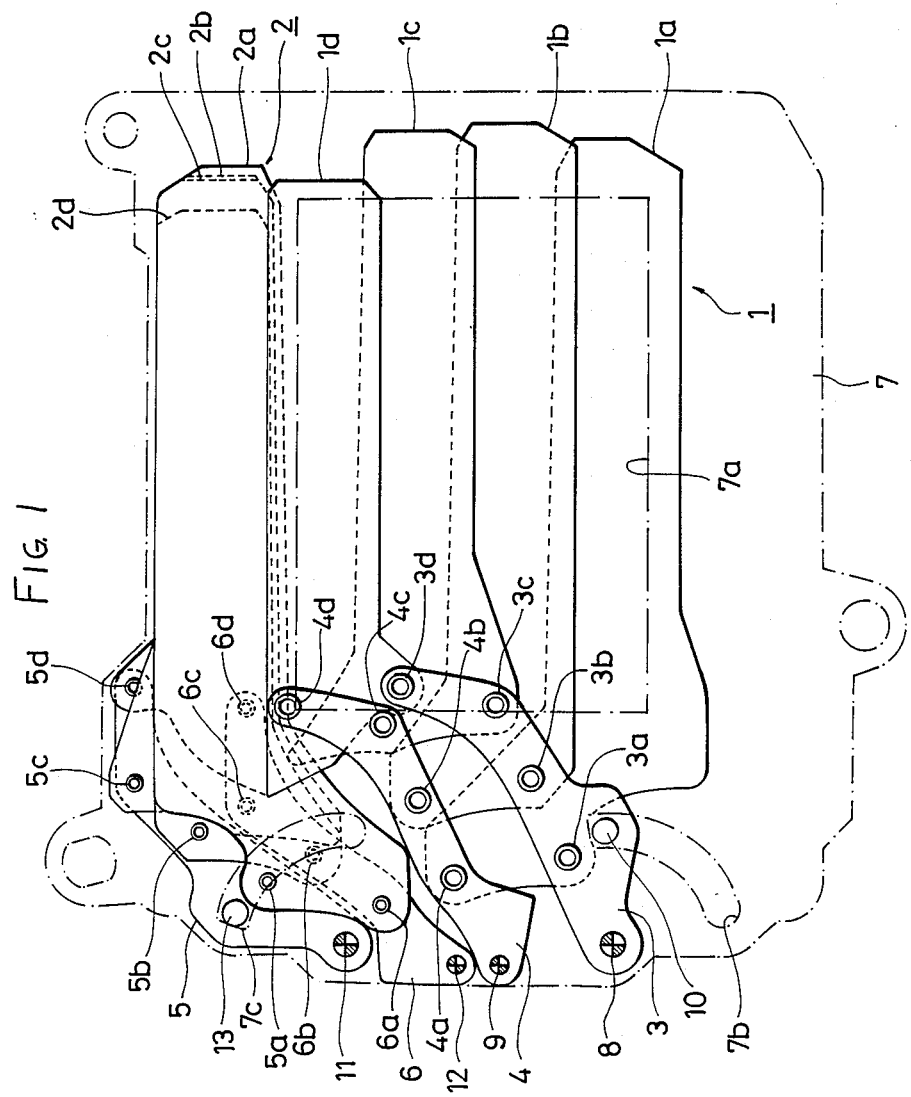
FIG. 1 is a plan view of a peripheral mechanism of blades of a focal plane shutter according to an embodiment of the present invention.

FIG. 1 is a plan view of a focal plane shutter according to an embodiment of the present invention, the focal plane shutter comprising a plurality of blade elements constituting a first blade group 1, a plurality of blade elements constituting a second blade group 2, coupling levers 3 and 4 for moving the first blade group 1, and coupling levers 5 and 6 for moving the second blade group 2 which are in the initial state.

In the initial state, an aperture 7a for the exposure formed in a substantially central portion of a base plate 7 supporting various mechanical members is closed by the first blade group 1.

In FIG. 1, the base plate 7 is positioned in the front of the various members, while in order to clarify the various members mounted behind the base plate 7, the base plate 7 is shown in phantom in FIG. 1.

The coupling lever 3 is swingably supported to the base plate 7 by an axis 8 and the coupling lever 4 is swingably supported to the base plate 7 by an axis 9.

A plurality of blade elements 1a, 1b, 1c and 1d constituting the first blade group 1 are rotatably mounted to the coupling lever 3 by pins 3a, 3b, 3c and 3d, respectively, and are also rotatably mounted to the coupling lever 4 by pins 4a, 4b, 4c and 4d, respectively. The plurality of blade elements 1a, 1b, 1c and 1d constitute parallel links together with the coupling levers 3 and 4 through the pins 3a, 3b, 3c, 3d, 4a, 4b, 4c and 4d.

A first blade driving pin 10 penetrating a slot 7b formed in the base plate 7 is engaged with the coupling lever 3. (A member to which the first blade driving pin 10 is fixedly mounted will be described later.) When the first blade driving pin 10 is moved down along the slot 7b, the coupling lever 3 is rotated clockwise about the axis 8 while the coupling lever 4 is rotated clockwise about the axis 9 in interlocked relationship with the rotation of the coupling lever 3. Accordingly, the plurality of blade elements 1a, 1b, 1c and 1d constituting the first blade group 1 are moved down to open the aperture 7a while keeping the parallel state.

In the same manner, the coupling lever 5 is swingably supported to the base plate 7 by an axis 11 and the coupling lever 6 is swingably supported to the base plate 7 by an axis 12.

The plurality of blade elements 2a, 2b, 2c and 2d constituting the second blade group 2 are rotatably mounted to the coupling lever 5 by pins 5a, 5b, 5c and 5d, respectively, and are also rotatably mounted to the coupling lever 6 by pins 6a, 6b, 6c and 6d, respectively. The plurality of blade elements 2a, 2b, 2c and 2d constitute parallel links together with the coupling levers 5 and 7 through the pins 5a, 5b, 5c, 5d, 6a, 6b, 6c and 6d.

A second blade driving pin 13 penetrating a slot 7c formed in the base plate 7 is engaged with the coupling lever 5. (A member to which the second blade driving pin 13 is fixedly mounted will be described later.) When the second blade driving pin 13 is moved down along the slot 7c, the coupling lever 5 is rotated clockwise about the axis 11 while the coupling lever 6 is also rotated clockwise about the axis 12 in interlocked relationship with the rotation of the coupling lever 5. Accordingly, the plurality of blade elements 2a, 2b, 2c and 2d constituting the second blade group 2 are moved down to close the aperture 7a while keeping the parallel state.

In the case of the focal plane shutter of the type shown in FIG. 1, a time difference between the start of the movement of the first blade group 1 and the start of the movement of the second blade group 2 corresponds to the exposure time.

Accordingly, in such a shutter, the shorter the exposure time is, the narrower the width of the slit for the exposure formed between a trailing edge of the first blade group 1 and the leading edge of the second blade group 1 is. When the width of slit is made narrower, an exposure error is increased since an area of the slit is varied largely even if slight error is produced in the velocity of movement of the blade groups. Accordingly, in order to maintain the accuracy of the exposure even if the exposure time is short, it is required to enlarge the slit width in the same exposure time and hence it is required to increase the velocity of movement of the blade groups.

Further, in the photography using the strobo unit, it is well known that the exposure aperture 7a is required to be fully opened at a time when the strobo unit is synchronized. Accordingly, in order to make short the exposure time capable of synchronizing the strobo unit, it is required to increase the moving velocity of the blade groups.

However, when the moving velocity of the blade groups is increased, large shock and oscillation are produced upon the termination of the movement of the blade groups. Accordingly, the focal plane shutter according to the present invention comprises a novel shock absorption mechanism for absorbing shock upon the termination of the movement of the blade groups.

An actual structure of a shutter driving mechanism including the shock absorption mechanism is described with reference to FIGS. 2 to 6.

Figure 2:
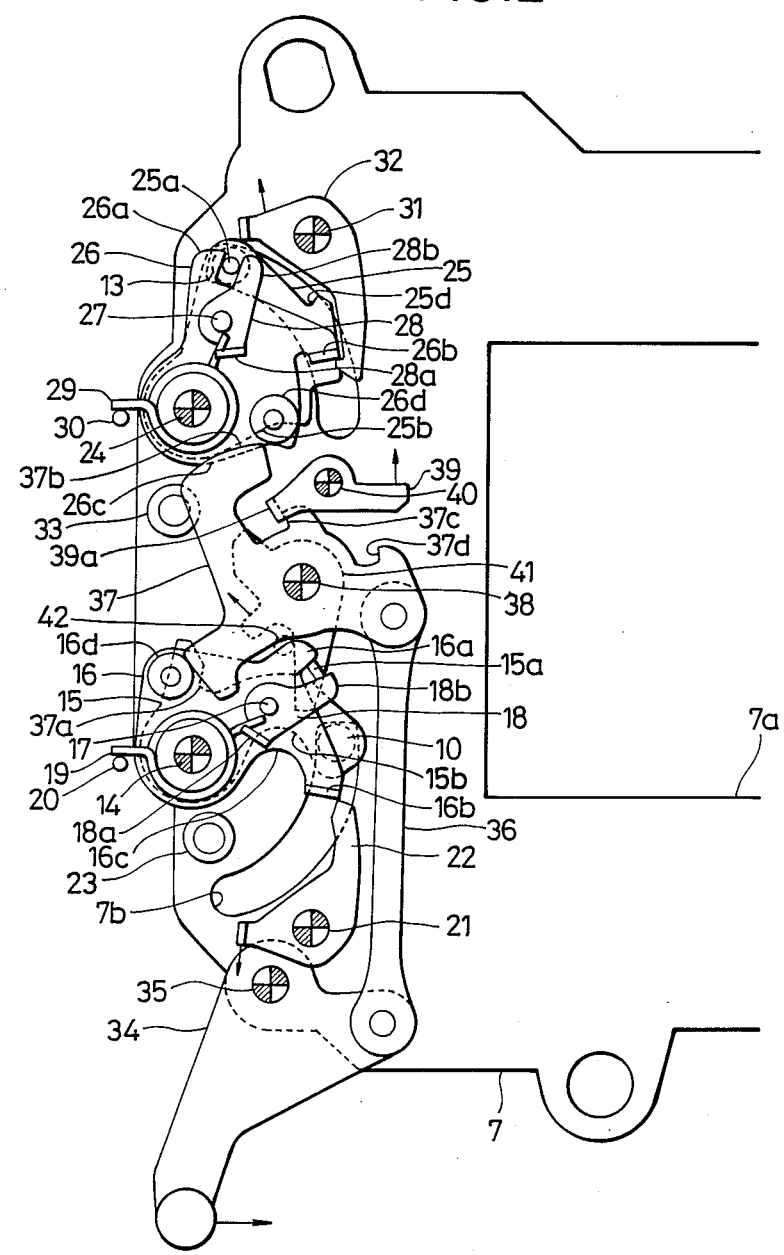
FIG. 2 is a plan view showing a shutter driving mechanism in a shutter charged state according to an embodiment of the present invention.
Figure 3:
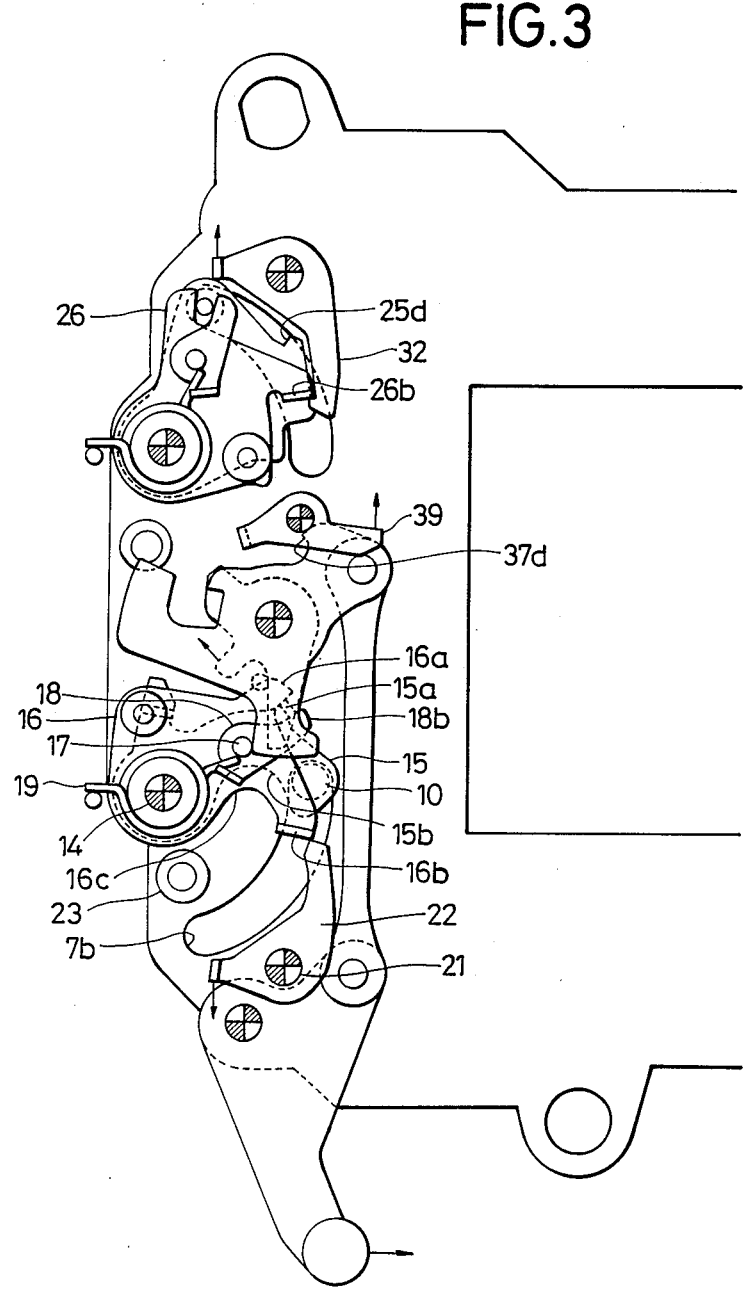
FIG. 3 is a plan view showing the mechanism shown in FIG. 2 in which the first blade group does not start its movement.
Figure 4:
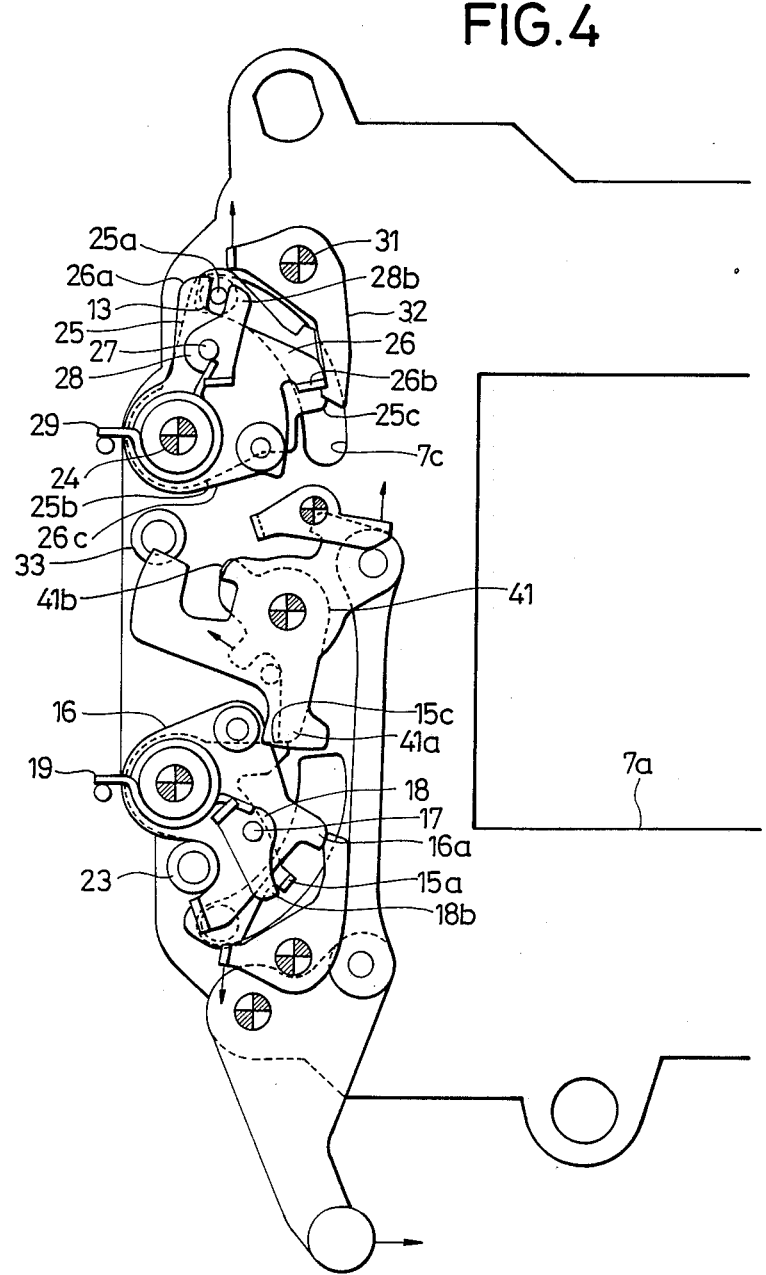
FIG. 4 is a plan view of the mechanism shown in FIGS. 2 and 3 in which the movement of the first blade group has terminated and the second blade group does not start its movement.
Figure 5:
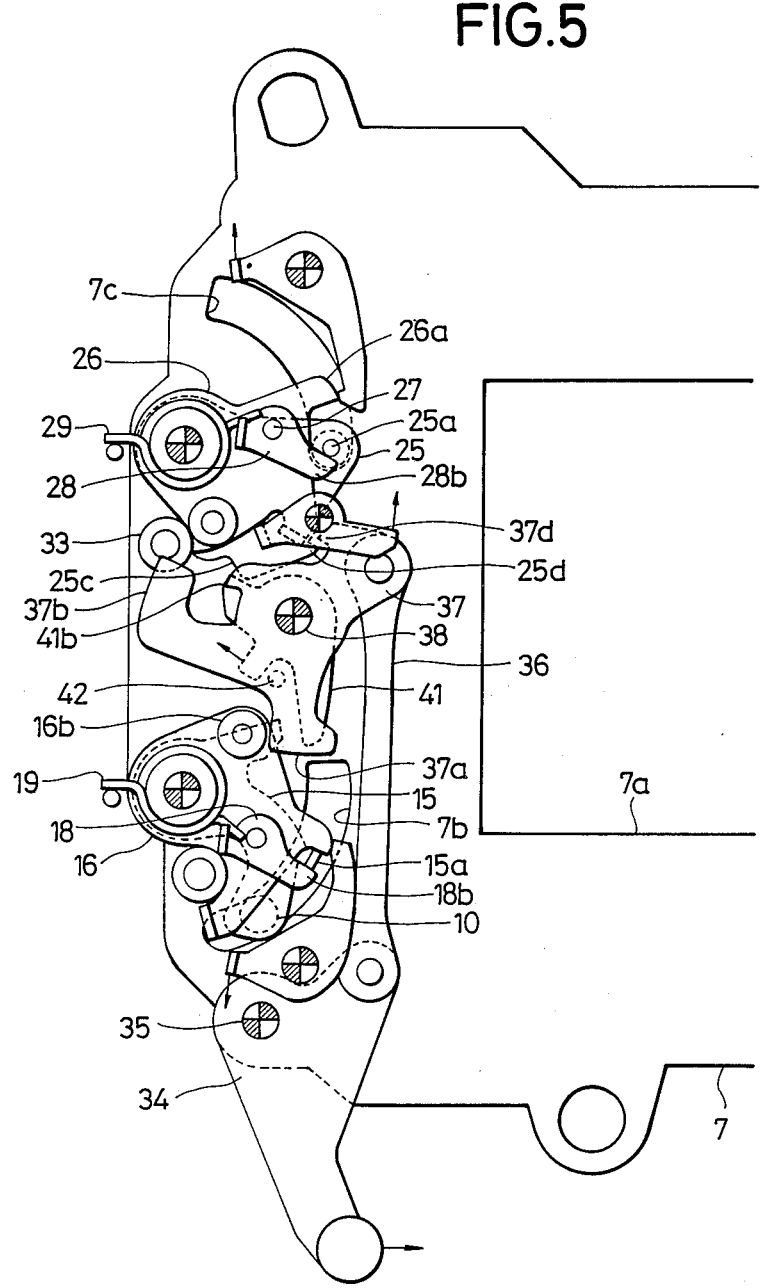
FIG. 5 is a plan view of the mechanism shown in FIGS. 2 to 4 in which the movement of the second blade group has terminated.
Figure 6:
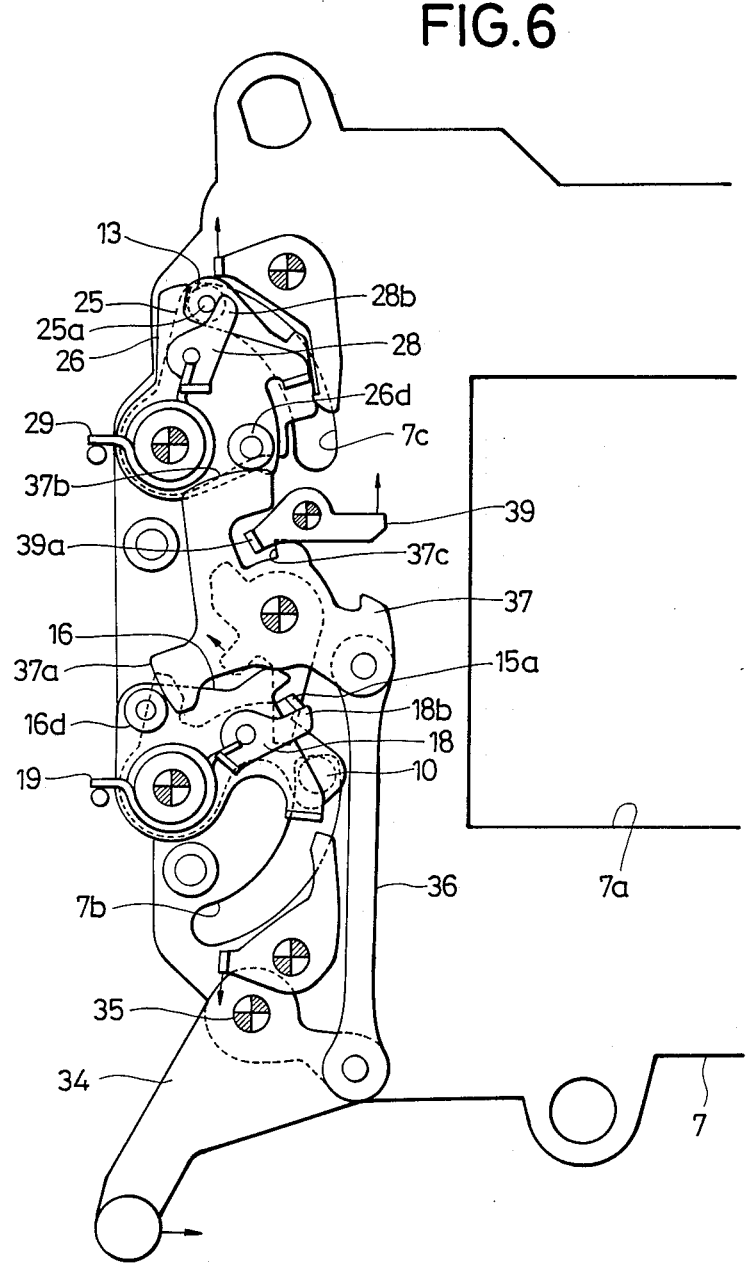
FIG. 6 is a plan view of the mechanism shown in FIGS. 2 to 5 and being in the overcharged state.

FIG. 2 shows a state immediately after the shutter charging operation has been completed, FIG. 3 shows a state immediately before the movement of the first blade group 1, FIG. 4 shows a state in which the movement of the first blade group 1 has been completed and the movement of the second blade group 2 is not started yet, FIG. 5 shows a state in which the movement of the second blade group 2 has been completed, and FIG. 6 shows a state in which the shutter is overcharged.

Many mechanical members shown in FIGS. 2 to 6 are energized by springs. However, when all of the springs are illustrated in the drawings, the drawings are extremely complicated. In order to avoid the complication of the drawings, only springs except importance springs in the present invention are illustrated by arrows indicating the energizing direction.

In FIGS. 3 to 6, in order to avoid the complexity of the drawings, reference numerals are given to only elements described in the specification for the explanation of operation thereof.

The driving mechanism of the first blades is now described.

A first blade operation lever 15 is swingably supported to an axis 14 mounted on the base plate 7. The aforementioned first blade driving pin 10 is mounted on the rear side of the first blade operation lever 15 and is engaged with the coupling lever 3 through the slot 7b.

A first blade driving lever 16 is swingably supported to the axis 14 in front of the first blade operation lever 15 and a first blade brake lever 18 is swingably supported to an axis 17 mounted on the front surface of the first blade driving lever 16. The first blade brake lever 18 serves to transmit a braking force to the first blade group 1 from the way of the movement of the first blade group 1.

A torsion spring 19 is used as a source of driving force for the first blade group 1 and is also used as a source of braking force for the first blade group 1 from the way of the movement of the first blade group 1. A fixed end of the torsion spring 19 is engaged with a pin 20 fixedly mounted to a camera body not shown and an operation end of the torsion spring 19 is engaged with a projection 18a formed in the first blade brake lever 18.

Accordingly, the first blade brake lever 18 receives a counter-clockwise rotating force about the axis 17 from the torsion spring 19. However, in the initial state, the counter-clockwise rotation of only the first blade brake lever 18 is prevented by a mechanism described below.

An arm 18b formed in the other end of the first blade brake lever 18 is brought into contact with one side of a projection 15a of the first blade operation lever 15 and the other side of the projection 15a is brought into contact with an arm 16a formed in the first blade driving lever 16.

Accordingly, the counter-clockwise rotation of the first blade brake lever 18 about the axis 17 received from the torsion spring 19 is prevented by the arm 16a through the arm 18b and the projection 15a. In the initial state, the first blade operation lever 15, the first blade driving lever 16 and the first blade brake lever 18 integrally receive the clockwise rotating force about the axis 14 from the torsion spring 19.

However, in the initial state, a projection 16b formed in the first blade driving lever 16 is engaged with a stoppage lever 22 supported to an axis 21 to prevent the clockwise rotation. Accordingly, the stoppage lever 22 is rotated clockwise by a known electromagnetic release member not shown and after the engagement of the lever 22 with the projection 16b is released, the first blade operation lever 15, the first blade driving lever 16 and the first blade brake lever 18 can be rotated integrally.

Numeral 23 denotes a stopper for stopping the first blade operation lever 15 and the first blade driving lever 16 at the end of the forward movement.

Accordingly, the first blade operation lever 15 and the first blade driving lever 16 are formed with contact surfaces 15b and 16c, respectively, which strike against the stopper 23.

The embodiment is characterized in that the contact surface 15b of the first blade operation lever 15 is formed at a position retreated as compared with the contact surface 16c of the first blade driving lever 16, that is, a position farther from the end of the forward movement in the initial state. Accordingly, there occurs a slight time lag until the contact surface 15b of the first blade operation lever 15 strikes against the stopper 23 after the contact surface 16c of the first blade driving lever 16 has struck against the stopper 23.

In the embodiment, the force of the torsion spring 19 is reversed by the first blade brake lever 18 during the time lag to transmit the force of the torsion spring 19 to the first blade operation lever 15 so that the braking force is applied to the first blade group 1.

The transmission of the braking force will be described in detail later.

The driving mechanism of the second blades is now described.

A second blade operation lever 25 is swingably supported to an axis 24 formed on the base plate 7. The aforementioned second blade driving pin 13 is mounted on the rear side of the second blade operation lever 25 and is engaged with the coupling lever 5 through the slot 7c.

A second blade driving lever 26 is swingably supported to the axis 24 in front of the second blade operation lever 25 and a second blade brake lever 28 is swingably supported to an axis 27 mounted on the front surface of the second blade driving lever 26. The second blade brake lever 28 serves to transmit a braking force to the second blade group 2 from the way of the movement of the second blade group 2.

A torsion spring 29 is used as a source of driving force for the second blade group 2 and is also used as a source of braking force for the second blade group 2 from the way of the movement of the second blade group 2. A fixed end of the torsion spring 29 is engaged with a pin 30 fixedly mounted to a camera body not shown and an operation end of the torsion spring 29 is engaged with a projection 28a formed in the second blade brake lever 28.

Accordingly, the second blade brake lever 28 receives a counter-clockwise rotating force about the axis 27 from the torsion spring 29. However, in the initial state, the counter-clockwise rotation of only the second blade brake lever 28 is prevented by a mechanism described below.

An arm 28b formed in the other end of the second blade brake lever 28 is brought into contact with one side of a pin 25a mounted in the second blade operation lever 25 and the opposite side of the pin 25a is brought into contact with an arm 26a formed in the second blade driving lever 26.

Accordingly, the counter-clockwise rotation of the second blade brake lever 28 about the axis 27 received from the torsion spring 29 is prevented by the arm 26a through the arm 28b and the projection 25a. In the initial state, the second blade operation lever 25, the second blade driving lever 26 and the second blade brake lever 28 integrally receive the clockwise rotating force about the axis 24 from the torsion spring 29.

However, in the initial state, a projection 26b formed in the second blade driving lever 26 is engaged with a stoppage lever 32 supported to an axis 31 to prevent the clockwise rotation. Accordingly, the stoppage lever 32 is rotated counter-clockwise by the known electromagnetic release member not shown and after the engagement of the lever 32 with the projection 26b is released, the clockwise rotation can be made.

Numeral 33 denotes a stopper for stopping the second blade operation lever 25 and the second blade driving lever 26 at the end of the forward movement.

Accordingly, the second blade operation lever 25 and the second blade driving lever 26 are formed with contact surfaces 25b and 26c, respectively, which strike against the stopper 33.

The embodiment is characterized in that the contact surface 25b of the second blade operation lever 25 is formed at a position retreated as compared with the contact surface 26c of the second blade driving lever 26 in the initial state. Accordingly, there occurs a slight time lag until the contact surface 25b of the second blade operation lever 25 strikes against the stopper 33 after the contact surface 26c of the second blade driving lever 26 has struck against the stopper 33.

In the embodiment, the force of the torsion spring 29 is reversed by the second blade brake lever 28 during the time lag to transmit the force of the torsion spring 29 to the second blade operation lever 25 so that the braking force is applied to the second blade group 2.

The transmission of the braking force will be described in detail later.

Numeral 34 denotes a set lever for initially setting the shutter mechanism.

The set lever 34 is swingably supported to an axis 35 mounted on the base plate 7 and is coupled with a set cam 37 through a set link 36.

When the set lever 34 in the state shown in FIG. 5 is rotated clockwise about the axis 35 against the force of the spring shown by arrow, the set link 36 is moved down to the state shown in FIG. 2 to rotate the set cam 37 clockwise about an axis 38.

Consequently, a cam surface 37a formed on the set cam 37 abuts against a set roller 16d which is rotatably supported to the first blade driving lever 16 to rotate the first blade driving lever 16 counter-clockwise.

Similarly, a cam surface 37b is formed on the set cam 37 abuts against a set roller 26d which is rotatably supported to the second blade driving lever 26 to rotate the second blade driving lever 26 counter-clockwise.

Numeral 39 denotes a release lever which is rotated clockwise by the shutter release operation made by a photographer. The release lever 39 is swingably supported to an axis 40 and is biased to be rotated counter-clockwise by a spring shown by arrow. A projection 39a formed on the release lever 39 is engaged with an engagement portion 37c formed in the set lever 37 in the initial state to prevent the counter-clockwise rotation of the set cam 37.

Further, numeral 41 denotes a first blade rebound stopper which is engaged with the first blade operation lever 15 until the movement of the second blade group 2 is terminated after the movement of the first blade group 1 has been terminated to prevent the first blade group 1 from being moved backward. The first blade rebound stopper 41 is rotatably supported to the axis 38 and is biased to be rotated clockwise by a spring, while the first blade rebound stopper 41 abuts against a boss 42 to be prevent from be rotated clockwise. Further, the set cam 37 is formed with a second blade rebound stopper 37d which is engaged with an engagement portion 25d formed on the second blade operation lever 25 when the movement of the second blade group 2 is terminated to prevent the second blade group 2 from being moved backward. The first blade rebound stopper 41 and the second blade rebound stopper 37d will be described in detail later.

Operation of the embodiment is now described with reference to the foregoing.

In the initial state, the peripheral mechanism of the shutter blade is set in the state shown in FIG. 1 and the driving mechanism thereof is set in the state shown in FIG. 2.

In the initial state, the counter-clockwise rotating force exerted on the set lever 34 from the spring is transmitted to the set cam 37 through the set link 36. However, the engagement portion 37c formed on the set cam 37 is engaged with the projection 39a formed on the release lever 39 to prevent the set cam 37 from being rotated counter-clockwise.

In this state, when the shutter release operation is made by the photographer, the release lever 39 is rotated clockwise against the force of the spring so that the engagement of the projection 39a formed on the set lever 39 and the engagement portion 37c formed on the set cam 37 is released. Consequently, the counter-clockwise rotating force exerted on the set lever 34 from the spring is transmitted to the set cam 37 through the set link 36 so that the set cam is rotated counter-clockwise.

When the set cam 37 is rotated counter-clockwise, the cam surface 37a formed on the set cam 37 is separated from the set roller 16d supported to the first blade driving lever 16 and at the same time the cam surface 37b formed on the set cam 37 is separated from the set roller 26d supported to the second blade driving lever 26. Further, the second blade rebound stopper 37d formed on the set cam 37 enters the path of movement of the engagement portion 25d formed on the second blade operation lever 25.

The state in this state is shown in FIG. 3.

In the state shown in FIG. 3, the projection 16d formed on the first blade driving lever 16 is engaged with the stoppage lever 22 and the projection 26b formed on the second blade driving lever 26 is engaged with the stoppage lever 32. Accordingly, at this time, the first and second blade groups 1 and 2 are maintained to the initial state still.

After the release lever 39 has been rotated clockwise, the electromagnetic release member not shown rotates the stoppage lever 22 clockwise against the force of the spring under the control of the known exposure control circuit to release the engagement of the first blade driving lever 16 with the stoppage lever 22.

As described above, in the initial state, the first blade operation lever 15, the first blade driving lever 16 and the first blade brake lever 18 integrally receive the clockwise rotating force about the axis 14 from the torsion spring 19. Accordingly, when the engagement of the first blade driving lever 16 with the stoppage lever 22 is released, the first blade operation lever 15, the first blade driving lever 16 and the first blade brake lever 18 are integrally rotated clockwise about the axis 14.

Accordingly, the first blade driving pin 10 mounted in the rear side of the first blade operation lever 15 is moved down along the slot 7b. Consequently, the coupling lever 3 is rotated clockwise about the axis 8 and the coupling lever 4 is also rotated clockwise about the axis 9 in interlocked relationship with the rotation of the lever 3. Accordingly, the blade elements 1a, 1b, 1c and 1d constituting the first blade group 1 are moved down to open the aperture 7a while maintaining the parallel state.

As described above, the contact surface 15b of the first blade operation lever 15 is formed at the position retreated as compared with the contact surface 16c of the first blade driving lever 16 in the initial state. Accordingly, even after the contact surface 16c strikes against the stopper 23 and the clockwise rotation of the first blade driving lever 16 is stopped, the first blade group 1, the coupling levers 3 and 4 and the first blade operation lever 15 continue to be moved by the force of inertia thereof and when the contact surface 15b of the first blade operation lever 15 strikes against the stopper 23, the movement of the first blade group 1, the coupling levers 3 and 4 and the first blade operation lever 15 is terminated.

When the first blade operation lever 15 is further rotated clockwise by the force of inertia even after the clockwise rotation of the first blade driving lever 16 is stopped, the projection 15a formed on the first blade operation lever 15 is separated from the arm 16a formed in the first blade driving lever 16. Since the projection 15a formed on the first blade operation lever 15 abuts against the arm 18b formed in the first blade brake lever 18, when the first blade operation lever 15 is further rotated clockwise by the force of inertia after the clockwise rotation of the first blade driving lever 16 is stopped, the projection 15a is engaged with the arm 18b so that the clockwise rotating force about the axis 17 is applied to the first blade brake lever 18.

On the other hand, since the first blade brake lever 18 receives the counter-clockwise rotating force about the axis 17 from the torsion spring 19, the first blade operation lever 15 receives the counter-clockwise rotating force applied to the first blade brake lever 18 from the torsion spring 19 as a braking force when the clockwise rotating force is added to the first blade brake lever 18 through the projection 15a. Further, since the first blade group 1 and the coupling levers 3 and 4 are coupled with the first blade operation lever 15, the first blade group 1 and the coupling levers 3 and 4 receive the braking force. Shock and oscillation produced upon the termination of the movement of the first blade operation lever 15, the first blade group 1 and the coupling levers 3 and 4 is reduced greatly by the brake force.

Thereafter, when the first blade operation lever 15 is moved until the contact surface 15b of the first blade operation lever 15 strikes against the stopper 23, the movement of the first blade operation lever 15 is completed.

When the movement of the first blade operation lever 15 is completed, the counter-clockwise rotating force added to the first blade brake lever 18 from the torsion spring 19 serves to reverse the first blade operation lever 15. However, when the movement of the first blade operation lever 15 is completed, since the engagement surface 15c formed on the first blade operation lever 15 is engaged with the arm 41a of the first blade rebound stopper 41, the reverse operation of the first blade operation lever 15 is prevented.

FIG. 4 shows a state in which the first blade operation lever 15 is engaged with the first blade rebound stopper 41 as described above.

Then, when the proper exposure time elapsed, the electromagnetic release member not shown rotates the stoppage lever 32 counter-clockwise about the axis 31 against the force of the spring under the control of the known exposure control circuit to release the engagement of the second blade driving lever 26 with the stoppage lever 32.

As described above, in the initial state, the second blade operation lever 25, the second blade driving lever 26 and the second blade brake lever 28 integrally receive the clockwise rotating force about the axis 24 from the torsion spring 29. Accordingly, when the engagement of the second blade driving lever 26 with the stoppage lever 32 is released, the second blade operation lever 25, the second blade driving lever 26 and the second blade brake lever 28 are integrally rotated clockwise about the axis 24.

Accordingly, the second blade driving pin 13 mounted in the rear side of the second blade operation lever 25 is moved down along the slot 7c. Consequently, the coupling lever 5 is rotated clockwise about the axis 11 and the coupling lever 6 is also rotated clockwise about the axis 12 interlocked relationship with the rotation of the lever 5. Accordingly, the blade elements 2a, 2b, 2c and 2d constituting the second blade group 2 are moved down to close the aperture 7a while maintaining the parallel state.

As described above, the contact surface 25b of the second blade operation lever 25 is formed at the position retreated as compared with the contact surface 26c of the second blade driving lever 26 in the initial state. Accordingly, even after the contact surface 26c strikes against the stopper 33 and the clockwise rotation of the second blade driving lever 26 is stopped, the second blade group 2, the coupling levers 5 and 6 and the second blade operation lever 25 continue to be moved by the force of inertia thereof and when the contact surface 25b of the second blade operation lever 25 strikes against the stopper 33, the movement of the second blade group 2, the coupling levers 5 and 6 and the second blade operation lever 25 is terminated.

When the second blade operation lever 25 is further rotated clockwise by the force of inertia even after the clockwise rotation of the second blade driving lever 26 is stopped, the pin 25a formed on the second blade operation lever 25 is separated from the arm 26a formed in the second blade driving lever 26. Since the pin 25a formed on the second blade operation lever 25 abuts against the arm 28b formed in the second blade brake lever 28, when the second blade operation lever 25 is further rotated clockwise by the force of inertia after the clockwise rotation of the second blade driving lever 26 is stopped, the pin 25a is engaged with the arm 28b so that the clockwise rotating force about the axis 27 is applied to the second blade brake lever 28.

On the other hand, since the second blade brake lever 28 receives the counter-clockwise rotating force about the axis 27 from the torsion spring 29, the second blade operation lever 25 receives the counter-clockwise rotating force applied to the second blade brake lever 28 from the torsion spring 29 as a braking force when the clockwise rotating force is added to the second blade brake lever 28 through the pin 25a. Further, since the second blade group 2 and the coupling levers 5 and 6 are coupled with the second blade operation lever 25, the second blade group 2 and the coupling levers 5 and 6 receive the braking force. Shock and oscillation produced upon the termination of the movement of the second blade operation lever 25, the second blade group 2 and the coupling levers 5 and 6 is reduced greatly by the brake force.

Thereafter, when the second blade operation lever 25 is moved until the contact surface 25b of the second blade operation lever 25 strikes against the stopper 33, the movement of the second blade operation lever 25 is completed.

In this manner, when the movement of the second blade operation lever 25 is completed, the counter-clockwise rotating force added to the second blade brake lever 28 from the torsion spring 29 serves to reverse the second blade operation lever 25. However, when the movement of the second operation lever 25 is completed, the engagement portion 25d formed in the second blade operation lever 25 is engaged with the second blade rebound stopper 37d formed in the set cam 37 and accordingly the reverse operation of the second blade operation lever 25 is prevented.

Further, in this manner, when the movement of the second blade operation lever 25 is completed, a step 25c formed on the second blade operation lever 25 is engaged with an engagement 41b of the first blade rebound stopper 41 to rotate the first blade rebound stopper 41 about the axis 38. Accordingly, the engagement of the first blade operation lever 15 with the first blade rebound stopper 41 is released.

FIG. 5 shows a state in which the movement of the second blade group 2 is completed as described above.

When the first blade operation lever 15 is released from the first blade rebound stopper 41, the first blade operation lever 15 is rotated counter-clockwise by the counter-clockwise rotating force transmitted from the torsion spring 19 through the first blade brake lever 18 so that the first blade group 1 is moved backward (in the direction of closing the aperture). However, at this time, since the aperture 7a is closed by the second blade group 2 already, there is not quite substantial influence.

After the exposure operation has been completed once as described above, the set lever 34 is rotated clockwise about the axis 35 against the force of the spring in interlocked relationship with a film winding operation performed by a motor or manually and the set cam 37 is also rotated clockwise through the set link 36.

Accordingly, the cam surface 37a formed on the set cam 37 abuts against the set roller 16d which is rotatably supported to the first blade driving lever 16 to rotate the first blade driving lever 16 counter-clockwise and the cam surface 37b formed on the set cam 37 abuts against the set roller 26d which is rotatably supported to the second blade driving lever 26 to rotate the second blade driving lever 26 counter-clockwise.

The first blade brake lever 18 which is swingably supported to the first blade driving lever 16 receives the counter-clockwise rotating force from the torsion spring 19 and the counter-clockwise rotating force is transmitted to the projection 15a of the first blade operation lever 15 through the first blade brake lever 18. Accordingly, when the first blade driving lever 16 is rotated counter-clockwise as described above, the first blade operation lever 15 is also rotated counter-clockwise while the projection 15a is engaged with the arm 18b of the first blade brake lever 18. Consequently, the coupling levers 3 and 4 are also rotated counter-clockwise to return the first blade group 1 to the initial position.

In the course of returning the first group 1 to the initial position, when the first blade driving pin 10 mounted to the first blade operation lever 15 strikes against the upper end of the slot 7b, the returning operation to the initial position of the first blade group 1, the coupling levers 3 and 4 and the first blade operation lever 15 is terminated. However, since the first blade driving lever 16 being in direct contact with the set cam 37 is formed separately from the first blade operation lever 15, the first blade driving lever 16 continues to be rotated counter-clockwise so that the first blade driving lever 16 is overcharged even after the first blade driving pin 10 strikes against the upper end of the slot 7b and the first blade group 1, the coupling levers 3 and 4 and the first blade operation lever 15 are stopped.

Similarly, the second blade brake lever 28 which is swingably supported to the second blade driving lever 26 receives the counter-clockwise rotating force from the torsion spring 29 and the counter-clockwise rotating force is transmitted to the pin 25a of the second blade operation lever 25 through the second blade brake lever 28. Accordingly, when the second blade driving lever 26 is rotated counter-clockwise as described above, the second blade operation lever 25 is also rotated counter-clockwise while the pin 25a is engaged with the arm 28b of the second blade brake lever 28. Consequently, the coupling levers 5 and 6 are also rotated counter-clockwise to return the second blade group 2 to the initial position.

In the course of returning the second group 2 to the initial position, when the second blade driving pin 13 mounted to the second blade operation lever 25 strikes against the upper end of the slot 7c, the returning operation to the initial position of the second blade group 2, the coupling levers 5 and 6 and the second blade operation lever 25 is terminated. However, since the second blade driving lever 26 being in direct contact with the set cam 37 is formed separately from the second blade operation lever 25, the second blade driving lever 26 continues to be rotated counter-clockwise so that the second blade driving lever 26 is overcharged even after the second blade driving pin 13 strikes against the upper end of the slot 7c and the second blade group 2, the coupling levers 5 and 6 and the second blade operation lever 25 are stopped.

FIG. 6 shows a state in which the second blade driving lever 26 has been overcharged.

Thereafter, when the clockwise rotating force added to the set lever 34 is released, the set lever 34 is rotated counter-clockwise by the force of the spring and the set cam 37 is also rotated counter-clockwise in interlocked relationship with the rotation of the set lever 34. Thus, when the set cam 37 is rotated counter-clockwise until the engagement portion 37c formed on the set cam 37 is engaged with the projection 39a formed on the release lever 39, the whole mechanism is returned to the initial state shown in FIG. 2.

Figure 7:
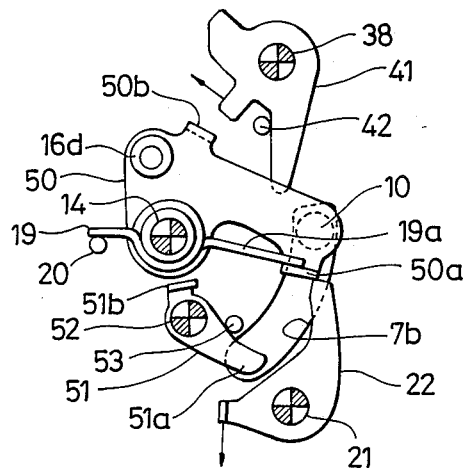
FIG. 7 is a plan view showing another embodiment of the present invention in which the first blade group does not start its movement.
Figure 8:
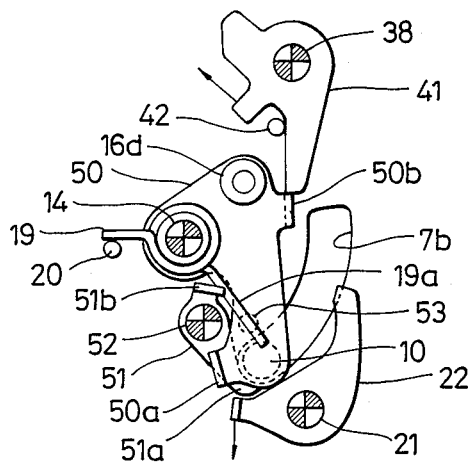
FIG. 8 is a plan view of the mechanism shown in FIG. 7 after the first blade group has begun to move.

FIGS. 7 and 8 are plan views showing another embodiment of the present invention. FIG. 7 shows a state in which the movement of the first blades is not started and FIG. 8 shows a state in which the movement of the first blades is completed.

In the drawings, the slot 7b, the first blade driving pin 10, the axis 14, the set roller 16d, the torsion spring 19, the pin 20, the axis 21, the stoppage lever 22, the axis 38, the first blade rebound stopper 41 and the boss 42 are the same elements as those described in FIGS. 2 to 6.

Further, numeral 50 denotes a driving lever having the function of the first blade operation lever 15 and the first blade driving lever 16 shown in FIGS. 2 to 6. The first blade driving pin 10 is mounted in the rear side of the driving lever 50. An operation end 19a of the torsion spring 19 is engaged with a projection 50a formed on the driving lever 50, and the driving lever 50 receives the clockwise rotating force about the axis 14 from the torsion spring 19.

Numeral 51 denotes a brake lever having the same function as that of the first blade brake lever 18 shown in FIGS. 2 to 6. The brake lever 51 is rotatably supported to an axis 52 and is prevented by a pin 53 from being rotated over the pin 53.

The brake lever 51 includes an arm 51a formed in one end thereof and a projection 51b formed in the other end. The arm 51a is formed so that when the driving lever 50 is rotated clockwise the arm 51a enters the path through which the first blade driving pin 10 passes, while the projection 51b is formed so that when the driving lever 50 is rotated clockwise the projection 51b enters the path through which the operation end 19a of the torsion spring 19.

The arm 51a and the projection 51b are positioned relatively to each other so that the operation end 19a of the torsion spring 19 is brought into contact with the projection 51b immediately before the first blade driving pin 10 comes into contact with the arm 51a in the course of the clockwise rotation of the driving lever 50. Further, a rotating axis 52 of the brake lever 51 is positioned so that the projection 50a formed on the driving lever 50 is separated from the operation end 19a of the torsion spring 19 due to the contact of the projection 51b and the operation end 19a of the torsion spring 19 before the driving lever 50 is rotated clockwise to the end of the forward movement (that is, before the first blade driving pin 10 mounted in the rear side of the driving lever 50 reaches the lower end of the slot 7b).

Operation of the embodiment shown in FIGS. 7 and 8 is now described.

When the electromagnetic release member not shown rotates the stoppage lever 22 clockwise about the axis 21 against the force of the spring, the engagement of the driving lever 50 with the stoppage lever 22 is released.

Consequently, since the driving lever 50 is rotated clockwise about the axis 14 by the force received from the torsion spring 19, the first blade driving pin 10 is moved down along the slot 7b. Accordingly, the first blade group 1 shown in FIG. 1 is moved in the opening direction.

When the driving lever 50 is rotated clockwise, the operation end 19a of the torsion spring 19 comes into contact with the projection 51b of the brake lever 51 and consequently the brake lever 51 receives the counter-clockwise rotating force from the torsion spring 19.

The first blade driving pin 10 comes into contact with the arm 51a immediately after the operation end 19a of the torsion spring 19 has come into contact with the projection 51b of the brake lever 51, although the driving lever 50 is rotated clockwise until the first blade driving pin 10 reaches the lower end of the slot 7b finally while the driving lever 50 is rotated clockwise by the force of inertia thereof and the force of inertia of the first blade group 1 shown in FIG. 1 and the coupling levers 3 and 4.

As described above, the brake lever 51 receives the counter-clockwise rotating force from the torsion spring 19 after the operation end 19a of the torsion spring 19 has come into contact with the projection 51b. In addition, before the driving lever 50 is rotated clockwise to the end of the forward movement, the projection 50a of the driving lever 50 is separated from the operation end 19a of the torsion spring 19 and the torsion spring 19 does not give the clockwise rotating force to the driving lever 50.

Accordingly, the driving lever 50 is rotated clockwise to the end of the forward movement by the force of inertia thereof and the force of inertia of the first blade group 1 and the coupling levers 3 and 4 against the counter-clockwise rotating force received from the torsion spring 19 through the brake lever 51. Accordingly, the kinetic energy of the driving lever 50, the coupling levers 3 and 4 and the first blade group 1 is attenuated until the first blade driving pin 10 reaches the lower end of the slot 7b so that shock and oscillation upon the termination of the movement is reduced greatly.

In this manner, when the driving lever 50 is rotated clockwise until the first blade driving pin 10 reaches the lower end of the slot 7b, the projection 50b of the driving lever 50 is engaged with the first blade rebound stopper 41 to stop the driving lever 50.

FIGS. 7 and 8 show modifications of the driving mechanism of the first blades, while it is needless to say that the similar modifications can be applied to the driving mechanism of the second blades.

As described above, the focal plane shutter of the present invention utilizes the single spring as a driving source for moving the shutter blades to the way of the movement of the shutter blades and as a source of force for braking the shutter blades from the way of the movement of the shutter blades.

Accordingly, the focal plane shutter of the present invention does not require an independent braking spring and a braking mechanism using friction and hence the space efficiency is improved.

In addition, since the shock absorption mechanism used in the focal plane shutter of the present invention is not provided with any member for friction, the shock absorption mechanism is not affected by variation of the coefficient of friction due to variation in temperature and the shock absorption capability thereof is not reduced by wearing of a friction member. Accordingly, the shock absorption mechanism according the present invention exhibits stable capability regardless of environment of using the camera.

Further, since the focal plane shutter of the present invention utilizes the shutter driving spring as a source of force for braking the shutter, it is not required to charge the shock absorption mechanism in addition to the charging operation of the shutter driving mechanism and increased amount of charging force can be prevented.

In the embodiment shown in FIGS. 2 to 6, the blade operation lever 15 (25) directly coupled with the shutter blades and the blade driving lever 16 (26) applied with the driving force from the spring 19 (29) constituting the driving source are separated from each other. Accordingly, in the embodiment, after the blade operation lever 15 (25) directly coupling with the shutter blades is returned to the end of the backward movement, the spring 19 (29) and the blade driving lever 16 (26) can be overcharged.

Accordingly, in the embodiment, even when the charging operation is ensured by overcharging the spring 19 (29) and the blade driving lever 16 (26), it is not necessary to overcharge the shutter blades. Accordingly, in order to overcharge the shutter blades, it is not required to enlarge upper space of a camera to the lower portion of a finder and the height of the camera can be suppressed.

What is claimed is:

1. A focal plane shutter including:

a shutter base plate in which an aperture for the exposure is formed;

a first blade group including a plurality of divided blade elements which close the aperture by unfolding the blade elements over the aperture and open the aperture by overlapping the blade elements at a position evacuated from the aperture;

a second blade group including a plurality of divided blade elements which open the aperture by overlapping the blade elements at the position evacuated from the aperture and close the aperture by unfolding the blade elements over the aperture;

a first blade driving spring which is kept in a charged state and moves forward said first blade group from the unfolding state to the overlapping state by releasing said first blade driving spring from the charged state;

a first blade driving force transmission mechanism which is engaged with said first blade driving spring to transmit the force of said first blade driving spring to said first blade group as a propelling force;

a second blade driving spring which is kept in the charged state and moves forward said second blade group from the overlapping state to the unfolding state by releasing said second blade driving spring from the charged state when a predetermined time has lapsed after said first blade driving spring has been released; and a second blade driving force transmission mechanism which is engaged with said second blade driving spring to transmit the force of said second blade driving spring to said second blade group as a propelling force;

wherein said first blade driving spring and said first blade driving force transmission mechanism engaged with each other can be separated from each other, and said second blade driving spring and said second blade driving force transmission mechanism engaged with each other can be separated from each other, and comprising:

a first blade brake lever which is swingably supported to an axis mounted at a position fixed to a camera body and includes a first arm formed in one end of said lever to engage with said first blade driving spring so that the forward movement of said first blade driving spring is prevented and a second arm formed in the other end of said lever to engage with said first blade driving force transmission mechanism so that the forward movement of said first blade driving force transmission mechanism is prevented, said first arm being engaged with said first blade driving spring before said first blade driving force transmission mechanism moves forward to the end of the forward movement to separate said first blade driving spring and said first blade driving force transmission mechanism engaged with each other and rotate said second arm so that the forward movement of said first blade driving force transmission mechanism is prevented; and a second blade brake lever which is swingably supported to an axis mounted at a position fixed to the camera body and includes a first arm formed in one end of said second blade brake lever to engage with said second blade driving spring so that the forward movement of said second blade driving spring is prevented and a second arm formed in the other end to engage with said second blade driving force transmission mechanism so that the forward movement of said second blade driving force transmission mechanism is prevented, said first arm being engaged with said second blade driving spring before said second blade driving force transmission mechanism moves forward to the end of the forward movement to separate said second blade driving spring and said second blade driving force transmission mechanism engaged with each other and rotate said second arm so that the forward movement of said second blade driving force transmission mechanism is prevented.

2. A focal plane shutter according to claim 1, wherein said first blade driving force transmission mechanism and the first blade group maintain the force of inertia capable of moving forward said first blade driving force transmission mechanism and said first blade group to the end of the forward movement thereof against the force applied thereto through the first blade brake lever to prevent the forward movement thereof even after said first blade driving spring and said first blade driving force transmission mechanism engaged with each other are separated from each other, and said second blade driving force transmission mechanism and the second blade group maintain the force of inertia capable of moving forward said second blade driving force transmission mechanism and said second blade group to the end of the forward movement thereof against the force applied thereto through the second blade brake lever to prevent the forward movement thereof even after said second blade driving spring and said second blade driving force transmission mechanism engaged with each other are separated from each other.

3. A focal plane shutter according to claim 1, comprising a first blade rebound stopper which is swingably supported to an axis mounted at a position fixed to the camera body to be engaged with said first blade driving force transmission mechanism at the end of the forward movement thereof and which releases the engagement with the first blade driving force transmission mechanism when said second blade driving force transmission mechanism is moved forward to the end of the forward movement thereof.

4. A focal plane shutter according to claim 2, comprising a first blade rebound stopper which is swingably supported to an axis mounted at a position fixed to the camera body to be engaged with said first blade driving force transmission mechanism at the end of the forward movement thereof and which releases the engagement with the first blade driving force transmission mechanism when said second blade driving force transmission mechanism is moved forward to the end of the forward movement thereof.

5. A focal plane shutter including:
a shutter base plate in which an aperture for the exposure is formed;
a first blade group including a plurality of divided blade elements which close the aperture by unfolding the blade elements over the aperture and open the aperture by overlapping the blade elements at a position evacuated from the aperture;
a second blade group including a plurality of divided blade elements which open the aperture by overlapping the blade elements at the position evacuated from the aperture and close the aperture by unfolding the blade elements over the aperture;
a first blade driving spring which is kept in a charged state and moves forward said first blade group from the unfolding state to the overlapping state by releasing said first blade driving spring from the charged state;
a first blade driving force transmission mechanism which is engaged with said first blade driving spring to transmit the force of said first blade driving spring to said first blade group as a propelling force;
a second blade driving spring which is kept in the charged state and moves forward said second blade group from the overlapping state to the unfolding state by releasing said second blade driving spring from the charged state when a predetermined time has lapsed after said first blade driving spring has been released; and
a second blade driving force transmission mechanism which is engaged with said second blade driving spring to transmit the force of said second blade driving spring to said second blade group as a propelling force; wherein
said first blade driving force transmission mechanism comprising:
a first blade operation lever which is swingably supported to an axis mounted at a position fixed to a camera body and is coupled with said first blade group to move said first blade group forward or backward in response to the swinging direction thereof;
a first blade driving lever which is swingably supported to an axis mounted at a position fixed to the camera body and includes an engagement portion engaged with said first blade operation lever so that said first blade operation lever is moved forward; and
a first blade brake lever which is swingably supported to an axis mounted at a position fixed to said first blade driving lever and includes a first arm formed in one end thereof to be engaged with said first blade driving spring and a second arm formed in the other end thereof to be engaged with said first blade operation lever so that said first blade operation lever is moved backward;
the end of the forward movement of the first blade driving lever being formed nearer to the initial position rather than the end of the forward movement of said first blade operation lever;
said second blade driving force transmission mechanism comprising:
a second blade operation lever which is swingably supported to an axis mounted at a position fixed to the camera body and is coupled with said second blade group to move said second blade group forward or backward in response to the swinging direction thereof;
a second blade driving lever which is swingably supported to an axis mounted at a position fixed to the camera body and includes an engagement portion engaged with said second blade operation lever so that said second blade operation lever is moved forward; and
a second blade brake lever which is swingably supported to an axis mounted at a position fixed to said second blade driving lever and includes a first arm formed in one end thereof to be engaged with said second blade driving spring and a second arm formed in the other end thereof to be engaged with said second blade operation lever so that said second blade operation lever is moved backward;
the end of the forward movement of the second blade driving lever is formed nearer to the initial position rather than the end of the forward movement of said second blade operation lever.

6. A focal plane shutter according to claim 5, wherein said first blade operation lever and said first blade group maintain the force of inertia capable of moving forward said first blade operation lever and said first blade group to the end of the forward movement against the force of said first blade driving spring transmitted through said first blade brake lever even after said first blade driving lever reaches the end of the forward movement, and
said second blade operation lever and said second blade group maintain the force of inertia capable of moving forward said second blade operation lever and said second blade group to the end of the forward movement against the force of said second blade driving spring transmitted through said second blade brake lever even after said second blade driving lever reaches the end of the forward movement.

7. A focal plane shutter according to claim 5, comprising a first blade rebound stopper which is swingably supported to an axis mounted at a position fixed to the camera body to be engaged with said first blade operation lever at the end of the forward movement thereof and which releases the engagement with said first blade operation lever when said second blade operation lever is moved forward to the end of the forward movement thereof.

8. A focal plane shutter according to claim 6, comprising a first blade rebound stopper which is swingably supported to an axis mounted at a position fixed to the camera body to be engaged with said first blade operation lever at the end of the forward movement thereof and which releases the engagement with said first blade operation lever when said second blade operation lever is moved forward to the end of the forward movement thereof.

9. A focal plane shutter according to claim 5, wherein the end of the backward movement of said second blade driving lever is formed in a position retreated as compared with the end of the backward movement of said second blade operation lever.

10. A focal plane shutter according to claim 6, wherein the end of the backward movement of said second blade driving lever is formed in a position retreated as compared with the end of the backward movement of said second blade operation lever.

11. A focal plane shutter according to claim 7, wherein the end of the backward movement of said second blade driving lever is formed in a position retreated as compared with the end of the backward movement of said second blade operation lever.

12. A focal plane shutter according to claim 8, wherein the end of the backward movement of said second blade driving lever is formed in a position retreated as compared with the end of the backward movement of said second blade operation lever.

* * * * *